US 6,676,860 B1

(12) United States Patent
Andersson

(10) Patent No.: US 6,676,860 B1
(45) Date of Patent: Jan. 13, 2004

(54) METHOD FOR THE FORMATION OF SOLID PARTICLES FROM A LIQUID

(75) Inventor: Alf Andersson, Ödåkra (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/806,032

(22) PCT Filed: Sep. 14, 1999

(86) PCT No.: PCT/SE99/01601
§ 371 (c)(1),
(2), (4) Date: May 18, 2001

(87) PCT Pub. No.: WO00/18511
PCT Pub. Date: Apr. 6, 2000

(30) Foreign Application Priority Data

Sep. 25, 1998 (SE) .............................................. 9803282

(51) Int. Cl.[7] .............................................. B29B 9/00
(52) U.S. Cl. .................. 264/8; 425/8; 75/333
(58) Field of Search ...................... 264/8; 425/8; 75/333

(56) References Cited

U.S. PATENT DOCUMENTS 3,266,085 A * 8/1966 Nacke ........................... 425/8
4,059,372 A * 11/1977 Barannik et al. ............... 425/8
4,323,523 A    4/1982 Ueda et al. .................... 264/8
4,978,069 A   12/1990 Andersson .................... 239/224

FOREIGN PATENT DOCUMENTS

FR    2 721 537    12/1995
GB    1 454 597    11/1976

* cited by examiner

Primary Examiner—Mary Lynn Theisen
(74) Attorney, Agent, or Firm—Burns, Doane, Swecker & Mathis, LLP

(57) ABSTRACT

Solid particles are formed from a liquid by rotating a slinger about a vertical axis within a chamber to sling liquid droplets from vertically spaced annular rows of cusps disposed on an outer periphery of the slinger. An air flow is established within the chamber, the air flow rotating in a direction opposite the direction of rotation of the slinger. The air flow opposes travel of threads formed between successively slung droplets to cause the threads to separate from the droplets and turn into dust particles which become entrained in the air flow. The dust particles can thus be collected separately from particles formed by the droplets.

11 Claims, 3 Drawing Sheets

METHOD FOR THE FORMATION OF SOLID PARTICLES FROM A LIQUID

TECHNICAL FIELD

Figure 1:
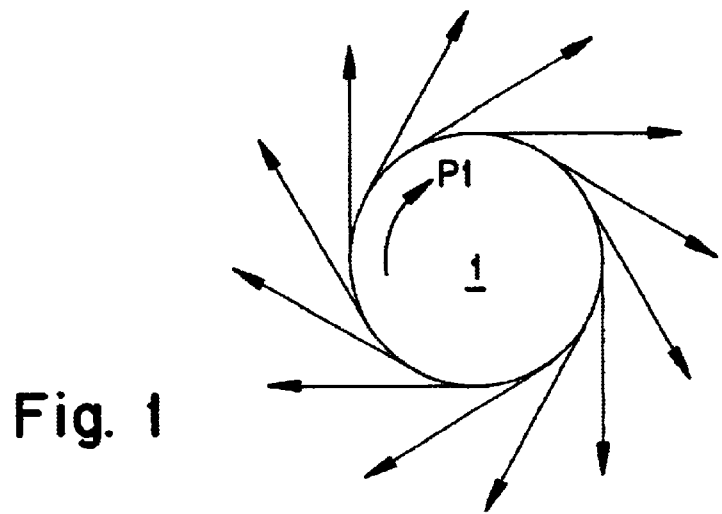
Figure 2:
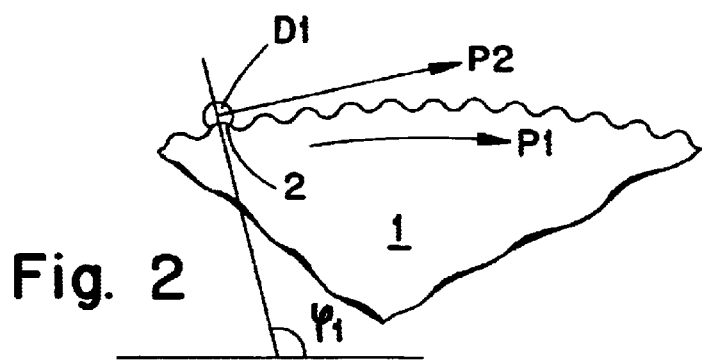
Figure 3:
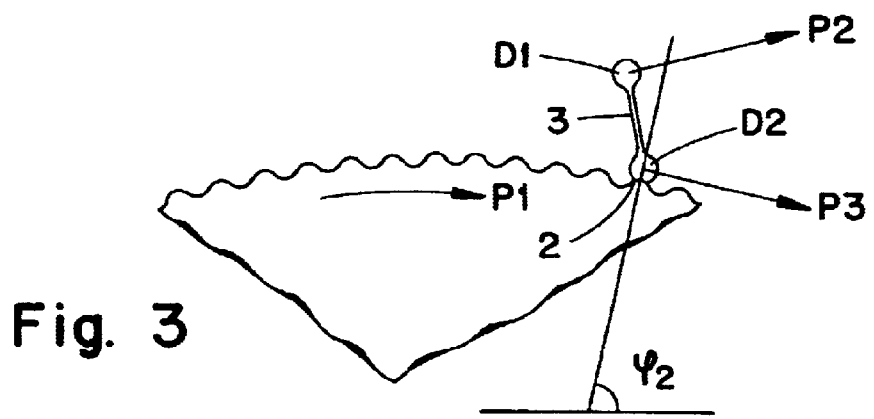
Figure 4:
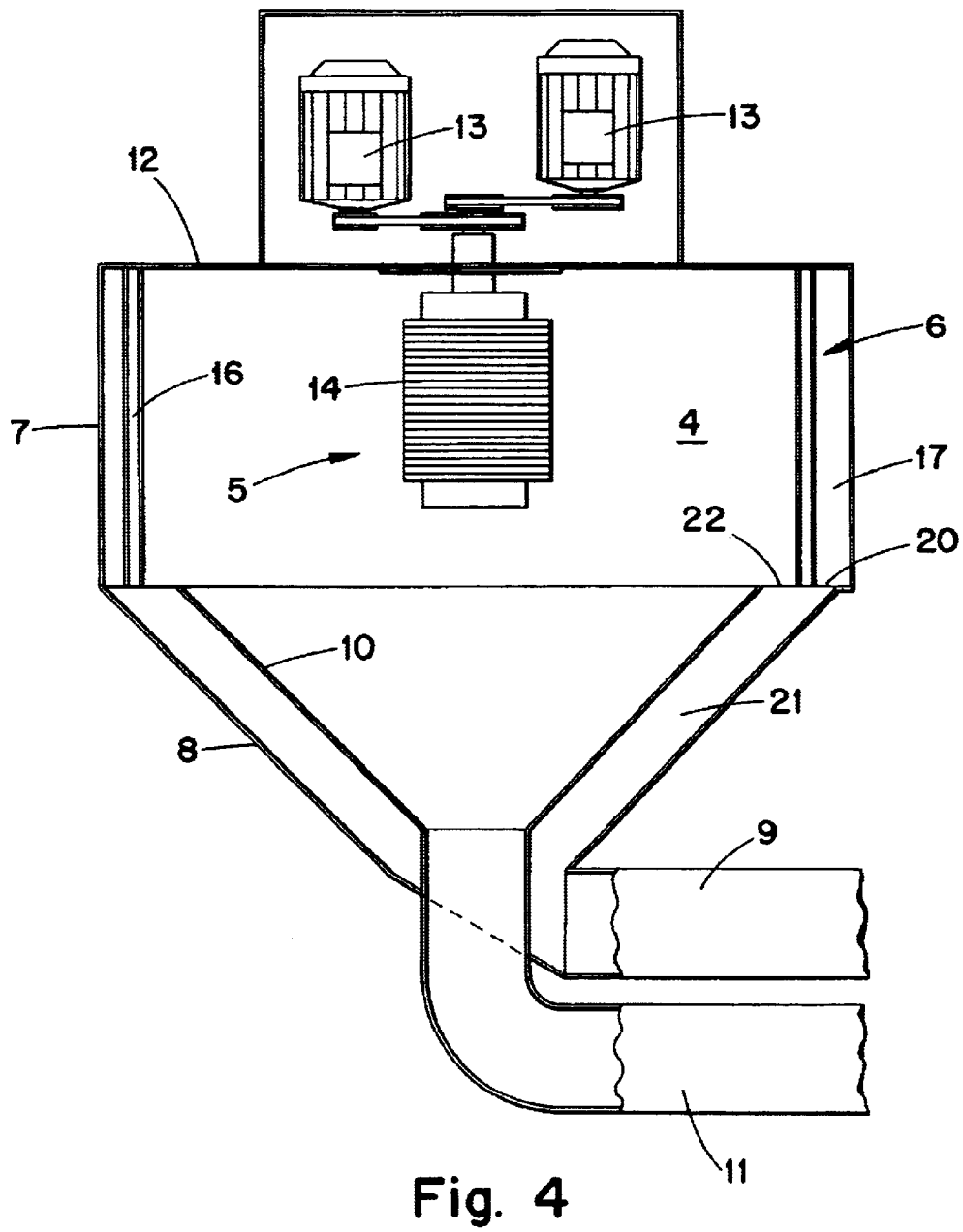
Figure 5:
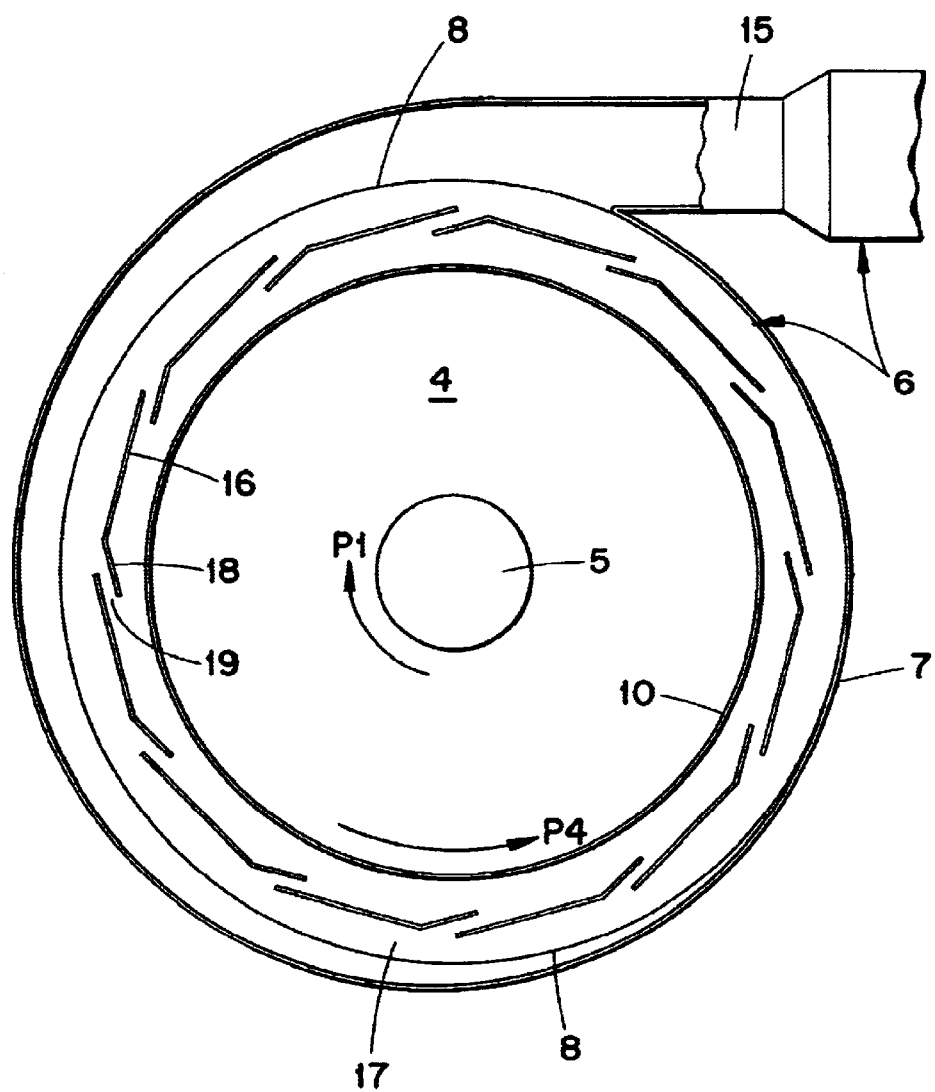

The present invention relates to a method and an arrangement for the formation of particles. More particularly, the present invention relates to a method for the formation of particles from a liquid, comprising the steps of forming droplets by means of an apparatus, which has a slinger means, which rotates in a direction of rotation and which has peripheral droplet-forming cusps, from which the liquid is slung in the form of droplets along diverging paths in a chamber which surrounds the apparatus and in which the droplets form solid particles, as well as an arrangement therefor.

BACKGROUND OF THE INVENTION

The above-mentioned method and arrangement are normally used for the preparation of a powder from a liquid, said powder containing substantially spherical particles of usually equal size.

In the preparation of powder particles from certain types of liquid or melt, there are particles in the prepared powder, which have considerably smaller size than the other particles. The small particles are often referred to as dust particles and cause trouble when the powder is used, as the dust particles produce a great deal of dust, thus causing problems in the work environment.

Until now the reason for the development of the dust particles has been unknown, and therefore it has not been possible to solve the dust problem in a suitable manner at the stage of preparing the powder particles.

An object of the present invention is to provide a method and an arrangement for the formation of particles from a liquid, said method and said arrangement eliminating or, at any rate, alleviating said dust problems.

SUMMARY OF THE INVENTION

The present invention is based on the discovery that the dust particles, which sometimes form in the preparation of particles with the use of the above-mentioned method or arrangement, originate from threads between two successive droplets from one and the same droplet-forming cusp. Such a thread is stretched out when the two droplets are slung out. This is due to the fact that the droplets are slung in tangential direction from the same cusp but in different angular positions in the plane of rotation. Since the angular positions differ, the tangents in the different positions will describe two diverging paths, seen perpendicularly to the plane of rotation. Thus, the distance will increase between the droplets when they are slung out, whereby the thread formed between them is stretched out and finally separated from the two droplets. The thread will then contract and form a small droplet, a so-called satellite droplet. When the satellite droplet moves in the chamber, it dries and forms a dust particle.

Normally, in the preparation of particles use is made of a plurality of rotating droplet-forming disks which are piled in the vertical direction, whereby a considerable production volume can be achieved. By the discovery on which the invention is based, it has also been shown that the satellite droplets formed at the lower droplet-forming disks are the satellite droplets which are later found in the form of dust particles among the finished powder particles. The reason for this is that the satellite droplets formed at the upper droplet-forming disks are very likely to collide with the larger droplets and combine with the same. At the lower droplet-forming disks, the satellite droplets will normally have time to leave the "swarm" of droplets before such a collision takes places.

To achieve the object, the invention provides a method according to claim 1 and preferred embodiments are stated in dependent claims 2–7. In addition, according to claim 8 an arrangement is stated, and preferred embodiments appear from dependent claims 9–11.

More specifically, the invention provides a method for the formation of particles from a liquid, comprising the steps of forming droplets by means of an apparatus, which has a slinger means, which rotates in a direction of rotation and which has peripheral droplet-forming cusps, from which the liquid is slung in the form of droplets along diverging paths in a chamber which surrounds the apparatus and in which the droplets form solid particles, said method being characterised by the step of generating in the chamber an air flow, which is opposite to the direction of rotation of the slinger means and which, for the separation of dust particles, acts on threads formed of the liquid at the slinger means, satellite droplets formed of the threads, and the dust particles formed of the satellite droplets.

The term "liquid" shall be considered herein to comprise also various types of melts, the chamber, in the case of a liquid, preferably being heated for the droplets to dry and form solid particles, and, in the case of a melt, preferably being cooled for the droplets to solidify and form solid particles.

Since the droplets are slung out from the cusps of the slinger means in a tangential forward direction, seen in the direction of rotation of the slinger means, a thread formed between two droplets will be slung transversely of its own longitudinal direction. The air flow, which is directed opposite to this slinging direction, will act on a comparatively large surface of the thread and thus exert an air resistance on the same which considerably slows it down, and when the thread is subsequently separated from the droplets and forms a satellite droplet, the satellite droplet is further slowed down and can be entrained by the air flow. The dust particles formed of the satellite droplets are thus separated from the other particles. As a result, a method is provided, which eliminates or reduces at least to a considerable extent the above-mentioned dust problems in connection with the preparation of particles.

In particular, a thread can form between two successive droplets from each droplet-forming cusp, a satellite droplet can form when the successive droplets move along a diverging path each and thus stretch out the thread which is formed between them and which is thus separated from the droplets and contracts, and a dust particle can form of a satellite droplet as it moves in the chamber.

According to a preferred embodiment of the inventive method, the air flow rotates. The rotating air flow can, especially, be generated by separate partial flows, which are passed into the chamber and combined therein to form a common flow.

According to one embodiment of the inventive method, the dust particles separated from the air flow are passed to a collection means. Owing to this, it is possible to recirculate the collected dust particles to the apparatus for reuse.

According to a further embodiment of the method according to the invention, the slinger means of the apparatus comprises a plurality of axial levels, on which the formation of droplets takes place, the air flow primarily acting on the lower levels of the slinger means. As a result, the action of the air flow is concentrated to the levels from which the major part of the dust particles originate. As mentioned above, this is due to the fact that the satellite droplets on the higher axial levels are very likely to collide with other droplets and thereby combine with the latter. On the lower levels, the satellite droplets are more likely to have the time to separate from the "swarm" of droplets before such a collision takes place.

Moreover, the invention provides an arrangement for the formation of particles from a liquid, comprising an apparatus, which has a slinger means, which rotates in a direction of rotation and which has peripheral droplet-forming cusps, from which the liquid is slung in the form of droplets along diverging paths in a chamber which surrounds the apparatus and in which the droplets form solid particles, said arrangement being characterised by an air means, which is arranged to generate in the chamber an air flow, which is opposite to the direction of rotation of the slinger means and which, for the separation of dust particles, acts on threads formed of the liquid, satellite droplets formed of the threads, and the dust particles formed of the satellite droplets.

This arrangement causes an action on the dust particles and their previous stages, which action results in the separation of the dust particles. Thus, the arrangement allows the formation of particles, which eliminates or alleviates the dust problem described above.

The air means is specially arranged to generate an air flow, which acts on (i) threads, which are formed between two successive droplets from each droplet-forming cusp, (ii) satellite droplets, which are formed when the droplets move along a diverging path each and thus stretch out the thread formed between them, said thread thus being separated from the droplets and contracting, and (iii) dust particles, which are formed of the satellite droplets when they move in the chamber.

Preferred embodiments of the arrangement are stated in the dependent claims.

A preferred embodiment of the invention will be described below, as an example, reference being made to the accompanying drawings.

SHORT DESCRIPTION OF THE DRAWINGS

FIG. 1 schematically shows the slinging direction of droplets from an apparatus for the formation of droplets.

FIG. 2 schematically shows the formation of a droplet at a droplet-forming cusp of a slinger means.

FIG. 3 schematically shows the formation of a subsequent droplet from the same droplet-forming cusp as in FIG. 2 and of a thread between the droplets.

FIG. 4 is a side view of an arrangement for the formation of particles according to the invention.

FIG. 5 is a plan view of the arrangement shown in FIG. 4.

DESCRIPTION OF EMBODIMENTS

The discovery on which the invention is based will now be described with reference to FIGS. 1–3.

FIG. 1 schematically shows the slinging direction of droplets coming from an apparatus for the formation of droplets. The apparatus comprises a slinger means, which is schematically shown as a disk 1 and which rotates in the direction indicated by the arrow P1. Each droplet will be slung from the slinger means in a tangential forward direction relative to its direction of rotation. As a result, the droplets will move along diverging paths, whereby a collision between the droplets is prevented.

In FIG. 2, part of the slinger means 1 of the apparatus is shown. The slinger means 1 has peripheral droplet-forming cusps, and a droplet D1, which is being formed, is shown at one of said cusps 2 in a first angular position $\phi$1. The direction of rotation of the slinger means 1 is illustrated by the arrow P1. When the centrifugal force acting on the droplet D1 exceeds the adhesive force, the droplet D1 will be slung in the direction indicated by the arrow P2.

In FIG. 3, the droplet-forming cusp has been moved to a second angular position $\phi$2. The droplet D1 has been lung tangentially forwards in a direction P2 away from the cusp 2 in the first angular position $\phi$1, and a new droplet D2 is being formed in the second angular position $\phi$2. The liquid from which the droplets are formed tends to form threads between successive droplets from one and the same droplet-forming cusp. Such a thread 3 has formed between the two droplets D1 and D2. When the droplet D2 is slung out from the slinger means 1, it will travel in the direction indicated by the arrow P3. Consequently, the droplets D1 and D2 will follow diverging paths, whereby the thread 3 will be stretched out. Finally, the thread 3 is separated from the droplets D1 and D2 and forms a satellite droplet (not shown) which is substantially smaller than the droplets D1 and D2. If this satellite droplet does not collide with a larger droplet, thus combining with the same, it will form a dust particle. As has been mentioned before, these dust particles cause dusting.

In FIGS. 4 and 5, to which reference is now being made, an arrangement according to the present invention is shown. The arrangement comprises a droplet-forming apparatus 5 arranged in a chamber 4 and an air means 6.

The chamber 4 has an upper cylindrical part with a helical outer wall 7 and a lower funnel-shaped part 8 with an outlet tube 9. In the lower part 8, a funnel 10 is concentrically arranged with an outlet tube 11. A cover plate 12 covers the upper end of the chamber 4.

The droplet-forming apparatus 5, which extends through the cover plate 12 into the chamber 4, is concentrically arranged in the upper part of the chamber 4. The apparatus 5 is driven by a pair of motors 13 which are arranged outside the chamber 4 and have a slinger means 14 with a plurality of axial levels. Droplet-forming cusps (not shown) are peripherally arranged on the respective levels.

The air means 6 comprises an inlet tube 15, which is tangentially connected to the outer wall 7, and an air guiding ring 16, which is radially arranged inside the outer wall 7 concentrically with the apparatus 5. As a result, a duct 17 is formed with a gradually decreasing cross-section between the outer wall 7 and the air guiding ring 16. The air guiding ring 16 has substantially tangentially directed guide plates 18, which are separated by openings 19.

The duct 17 communicates with a space 21 between the lower part 8 and the funnel 10 via a circumferential gap 20.

When the arrangement is used for the formation of particles, the apparatus is supplied with a liquid, which is slung, as described above, in the form of droplets tangentially forwards from the slinger means 14. The droplets travel in the chamber 4 while forming solid particles. Since all the droplets are substantially of the same size, they will be slung a substantially equal distance, and a circumferential gap 22 formed between the lower part 8 and the funnel 10 is arranged at such a distance from the apparatus 5 that the particles fall down through the gap 22 into said space 21. If a particle should be slung further away, it will impinge on the air guiding ring 16 and then fall via said gap 22 down into the space 21.

At the same time, an air flow is ducted from an air source (not shown) into the duct 17 via the inlet tube 15. Part of the air flow will be discharged through the outlet tube 9 via the gap 20, and thus generates in the space 21 a suction effect which entrains the particles. The rest of the air flow will be guided by the guide plates 18 into the chamber 4 via the openings 19. As the air is introduced tangentially into the chamber 4, the air therein will be rotated in the direction shown by the arrow P4. The slinger means 14 of the apparatus 5 rotates in the opposite direction P1. Consequently, the droplets will be exposed to an opposed air flow. As has been mentioned above, this air flow acts on the threads formed between successive droplets, so that the satellite droplets thus formed are slowed down, stopped or entrained and assume the speed and direction of the air flow. Then the air flow entrains the dust particles formed of the satellite droplets and pass them into the funnel 10 and on through the outlet tube 11.

Thus, a separation of the dust particles from the rest of the particles is achieved.

As mentioned above, the major part of the dust particles originate from the lower levels of the apparatus. For this reason, the openings 19 can be designed such that a major part of the air flow acts on the lower levels and only a minor part of the air flow acts on the upper levels.

It will be appreciated that the invention can be accomplished in other ways. For instance, other types of air means may be used to generate an opposed air flow in the chamber.

For example, the air means may lack an air guiding ring. An opposed air flow may then be generated by tangentially injecting air into the cylindrical chamber.

It is also possible to generate the air flow by applying a suction effect in one of the outlet tubes.

Nor is it necessary to supply the air to the chamber via one inlet. The air means may comprise a plurality of peripherally arranged air inlets, through which a partial flow enters the chamber, the partial flows being united in the chamber and combined into a single opposed air flow.

The expression "opposed air flow" refers to an air flow which comprises at least one component, which is directed tangentially opposite to the direction of rotation of the apparatus.

It will finally be appreciated that the existing motors for the operation of the droplet-forming apparatus may be used for driving an assembly, which generates said air flow.

The present invention is thus not limited to the shown embodiment, and other modifications and variations are feasible. The scope of the present invention is defined by the appended claims.

What is claimed is:

1. A method for forming solid particles from a liquid comprising the steps of:
   A) rotating a slinger about an axis to sling liquid from cusps disposed on an outer periphery of the slinger, the liquid exiting the cusps within a chamber in the form of droplets which turn into solid particles within the chamber; and
   B) generating within the chamber during step A an air flow traveling in a rotational direction in the chamber opposite a direction of rotation of the slinger for opposing movement of the droplets when the droplets enter the air flow after being slung from the slinger.

2. The method according to claim 1 wherein during step A threads of the liquid form between successively slung droplets, step A further comprising the step of causing the air flow to act on the threads to cause the threads to slow down and separate from the droplets, the separated threads forming satellite droplets that turn into dust particles which, during step B, become entrained in the air flow and separated from the solid particles formed by the droplets.

3. The method according to claim 2, further comprising the step of conducting the dust particles to a collector, subsequent to step B.

4. The method according to claim 2, further including the step of recirculating the dust particles to the slinger for recycling, subsequent to step B.

5. A method for forming solid particles from a liquid comprising:
   A) rotating a slinger about a substantially vertical axis within a chamber to sling liquid from vertically spaced annular rows of cusps disposed on an outer periphery of the slinger, the liquid exiting the cusps in the form of droplets which turn into solid particles within the chamber; and
   B) generating during step A an air flow rotating within the chamber in a direction opposite a direction of rotation of the slinger, wherein the air flow opposes the travel of threads formed between successively slung droplets to cause the threads to separate from the droplets and turn into dust particles which become entrained in the air flow.

6. An apparatus for forming solid particles from a liquid comprising:
   a chamber;
   a slinger arranged to rotate in the chamber about an axis and including cusps arranged on an outer periphery of the slinger from which liquid is slung in the form of droplets during rotation of the slinger, the droplets turning into solid particles;
   and an air flow generating mechanism for generating within the chamber an air flow into which the droplets are slung, the air flow being directed to travel in a rotational direction in the chamber opposite the direction of rotation of the slinger for opposing movement of the droplets.

7. The apparatus according to claim 6 wherein the chamber is cylindrical, the air flow generating mechanism comprising an air guiding ring arranged coaxially about the axis and defining an outer periphery of the chamber, the air guiding ring including circumferentially spaced openings for directing the air flow tangentially into the chamber.

8. The apparatus according to claim 6 including a collector mechanism for collecting solid particles emerging from the chamber.

9. The apparatus according to claim 8 wherein the collector mechanism comprises first and second collectors for collecting heavier and lighter particles, respectively.

10. The apparatus according to claim 9 wherein each of the collectors comprises a funnel disposed beneath the chamber.

11. The apparatus according to claim 10 wherein the funnels are coaxially arranged, with the first funnel arranged inside of, and spaced radially from, the second funnel.

* * * * *